United States Patent [19]

Moses et al.

[11] Patent Number: 4,490,449
[45] Date of Patent: Dec. 25, 1984

[54] CELL SOLVENT

[75] Inventors: Peter R. Moses, Windham; William L. Bowden, Nashua, both of N.H.

[73] Assignee: Duracell Inc., Bethel, Conn.

[21] Appl. No.: 533,684

[22] Filed: Sep. 19, 1983

[51] Int. Cl.³ .................................................. H01M 10/44
[52] U.S. Cl. ............................... 429/196; 429/194; 429/197; 429/198; 429/224
[58] Field of Search ............... 429/196, 194, 197, 198, 429/224

[56] References Cited

U.S. PATENT DOCUMENTS

| | | | |
|---|---|---|---|
| 3,871,915 | 3/1975 | Brych | 429/196 |
| 4,071,665 | 1/1978 | Garth | 429/197 |
| 4,086,403 | 4/1978 | Whittingham | 429/194 |
| 4,279,972 | 7/1981 | Moses | 429/194 |
| 4,284,692 | 8/1981 | Rao et al. | 429/194 |
| 4,379,817 | 4/1981 | Kozawa | 429/194 |
| 4,401,735 | 8/1983 | Moses et al. | 429/224 |
| 4,416,960 | 11/1983 | Eustace et al. | 429/197 |

OTHER PUBLICATIONS

Okada et al., (1) Chem. Abst. 83, (1975), #59441.
Okada et al., (2) Chem. Abst. 84, (1976), #165240.

*Primary Examiner*—Arthur P. Demers
*Attorney, Agent, or Firm*—Ronald S. Cornell; Israel Nissenbaum

[57] ABSTRACT

A non-aqueous electrochemical cell having a non-polymerizing substituted dioxolane electrolyte solvent and a highly oxidizing cathode depolarizer particularly manganese dioxide.

11 Claims, No Drawings

CELL SOLVENT

This invention relates to electrolyte solvents for non-aqueous electrochemical cells particularly those containing lithium anodes and manganese dioxide cathode depolarizers.

Currently available commercial Li/MnO$_2$ cells contain an electrolyte comprised of propylene carbonate (PC) and dimethoxyethane (DME) generally in a 1:1 volume ratio with LiClO$_4$ electrolyte salt dissolved therein. Such electrolyte however contains a highly volatile component, i.e. DME, and efforts have been made to find effective alternative electrolyte solvents to replace the DME. In U.S. Pat. No. 4,401,735 a 1,3 dioxolane solvent was described as being utilized in a Li/MnO$_2$ cell. Such solvent provided the advantages of low cost, low toxicity, stability with lithium, good low temperature performance and a highly conductive electrolyte since it was able to solvate substantial quantities of lithium salts. However, when the 1,3 dioxolane is utilized in cells such as Li/MnO$_2$ cells which have highly oxidizing cathodes, i.e. open circuit voltages (OCV) in excess of 3 volts, the 1,3 dioxolane tends to polymerize even upon standing. Such polymerization, either catalytic or oxidative, increases the viscosity of the 1,3 dioxolane to that of a gel with concomitant increase in resistivity. In low rate cells such as those described in the aforementioned patent such polymerization may be useful in preventing leakage with significant effect on the low rate discharge. However, in high rate cells performance is drastically curtailed with such polymerization.

It is an object of the present invention to provide an electrochemical cell with a modified dioxolane containing electrolyte which is not subject to detrimental polymerization even in the presence of a highly oxidizing cathode depolarizer. This and other object, features and advantages of the present invention will become more evident from the following discussion.

Generally the present invention comprises a non-aqueous electrochemical cell having an alkali or alkaline earth metal anode (including alloys and mixtures thereof) particularly of lithium and a highly oxidizing (OCV in excess of 3 volts) solid cathode depolarizer such as MnO$_2$. The electrolyte is comprised of an electrolyte salt (usually a salt of the anode metal) dissolved in a solvent comprised of methyl substituted dioxolane. The methyl group is preferably positioned at the 4 (or identical 5 position). The methyl group may also be positioned at the 2 position or disubstituted at either a single position or at two positions (2,2-dimethyl-1,3 dioxolane; 4,4-dimethyl-1,3 dioxolane; and 2,4-dimethyl-1,3 dioxolane) in less preferred embodiments. It has been discovered that such substitution of the 1,3 dioxolane substantially prevents the detrimental polymerization thereof. Though the substitution of the dioxolane prevents polymerization such substitution should be limited in both constituent size and number of positions since increases tend to diminish the current carrying capability of the electrolyte. The advantages of non-polymerization may be in fact negated by such reduced electrolyte performance.

An additional benefit of the present invention is a safety aspect. Polymerization of the cell electrolyte which occurs with the unsubstituted 1,3 dioxolane may result in certain hazardous conditions. The decrease in current carrying capability of the electrolyte, caused by the polymerization thereof, may cause an increase in internal cell resistance which, under conditions of cell abuse, particularly in high rate configured cells, may futher cause a detrimental increase in internal cell temperature. With a reactive electrolyte salt such as a perchlorate such temperature rise may result in severe untoward cell reactions. Since the electrolyte of the present invention is not subject to polymerization such hazardous conditions are avoided and cell safety is enhanced.

In U.S. Pat. No. 4,071,665, solvents such as 1,3 dioxolane and substituted dioxolanes are described as being utilized in electrochemical cells. However, no differentiation was made between the properties of the unsubstituted 1,3 dioxolane and the substituted dioxolanes and in fact the unsubstituted 1,3 dioxolane was described as being the preferred solvent. As a result it was noted in said patent that dioxolanes, as a general group, are subject to polymerization and a tertiary nitrogen base was accordingly added to the electrolyte to suppress polymerization tendency. In the specific examples given therein, wherein the 1,3 dioxolane and the substituted dioxolane were utilized without a tertiary nitrogen base additive, the cathode was not a highly oxidizing one, i.e. CuS. In such cell even the unsubstituted 1,3 dioxolane was not subject to any substantial polymerization.

Electrolyte salts suitable for use in the solvent of the present invention include alkali and alkaline earth metal salts such as halides, tetrafluoroborates, hexafluorophosphates, hexafluoroarsenates, tetrachloroaluminates and perchlorates. Other salts include trichloroacetate, trifluoroacetate, trifluoromethane acetate and trifluoromethane sulfonate as well as other commonly utilized electrolyte salts. The most preferred salt is the perchlorate such as LiClO$_4$ because it provides the highest conductivity.

Examples of highly oxidizing (above 3 volts OCV) cathode materials, in addition to MnO$_2$, which tend to spontaneously polymerize 1,3 dioxolane but which are useful in the present invention include V$_2$O$_5$, CF$_x$, CrO$_3$ and Ag$_2$CrO$_4$. The use of the methyl substituted dioxolanes of the present invention precludes such polymerization without the necessity for polymerization inhibitors as in U.S. Pat. No. 4,071,665.

The solvents of the present invention may be utilized alone or, for enhanced conductivity, in conjunction with other non-polymerizing and preferably non-volatile solvents such as propylene carbonate, gamma butyrolactone and sulfolane.

In order to more clearly illustrate the efficacy of the present invention the following examples are presented. It is understood that such examples are for illustrative purposes only and any details contained therein are not to be construed as being limitations on the present invention. Unless otherwise indicated all parts are parts by weight.

EXAMPLE 1

A 0.5M LiClO$_4$ in 1,3 dioxolane electrolyte solution was electrochemically oxidized at 0.63 mA/cm$^2$. After about 150 seconds the voltage rose precipitously thereby indicating polymerization of the electrolyte.

EXAMPLES 2–4

Solutions of 0.5M LiClO$_4$ in 2-methyl-1,3 dioxolane; 4-methyl-1,3 dioxolane; and 2,2-dimethyl-1,3 dioxolane were electrochemically oxidized as in Example 1. There were no indications of polymerization even after more than 550 seconds.

EXAMPLE 5 (PRIOR ART)

A high rate cell having the dimensions 0.6" diameter × 1.2" height (1.5 × 3 cm) is made with spirally wound electrodes with each being 1" × 8" (2.5 × 20.3 cm). The anode is a 0.5 gm Li foil and the cathode is 7 gms of $MnO_2$, graphite and polytetrafluoroethylene (PTFE) binder (90:6:4). The cell is filled with about 2 gms of 0.86M $LiClO_4$ in 1,3 dioxolane. The cell exhibits an OCV of 3.03 volts. The cell is subjected to a charging abuse (300 mA) and after 1 hour ruptures violently.

EXAMPLE 6

A cell is made in accordance with Example 5 but with a 2 gm electrolyte of 1.0M $LiClO_4$ in 4-methyl-1,3 dioxolane. The OCV of the cell is 3.02. The cell is subjected to the same charging abuse as in Example 5 and quietly vents with current being terminated after 4.5 hours.

EXAMPLE 7

A cell is made as in Example 5 but with a 2 gm electrolyte of 4-methyl-1,3 dioxolane:PC mixed solvent in a 3:1 volume ratio. The cell is discharged at room temperature under a 100 ohm load and provides about 1.34 Ahrs to a 2.0 volt cutoff.

EXAMPLE 8

A cell as in Example 7 is discharged at 0° C. under a 50 ohm load and provides about 1.1 Ahrs to a 2.0 volt cutoff.

EXAMPLE 9

A cell is made as in Example 5 but with a 2 gm electrolyte of 0.75M $LiAsF_6$ in 4-methyl-1,3-dioxolane:PC mixed solvent in a 9:1 volume ratio. The cell is discharged at room temperature under a 100 ohm load and provides about 1.35 Ahrs to a 2.0 volt cutoff.

The discharge capacities of the cells in Examples 7-9 is substantially identical to or better than the capacities obtained, under similar conditions, from cells containing conventional $LiClO_4$ in PC:DME electrolytes. Such capacities are obtained without the presence of volatile ethers such as DME and without detrimental polymerization of the electrolyte.

It is understood that the above examples are only illustrative in nature and that changes may be made in cell components, ratios and structure without departing from the scope of the present invention as defined in the following claims.

What is claimed is:

1. A non-aqueous electrochemical cell comprising an anode comprised of an alkali or alkaline earth metal, a cathode depolarizer which provides an open circuit voltage with said anode of at least 3 volts, and an electrolyte comprised of an electrolyte salt dissolved in a non-aqueous solvent characterized in that said solvent is comprised of a substantially non-polymerizing methyl substituted 1,3 dioxolane.

2. The cell of claim 1 wherein said methyl substituted 1,3 dioxolane is selected from the group consisting of 4-methyl-1,3 dioxolane; 2-methyl-1,3 dioxolane; 2,2-dimethyl-1,3 dioxolane; 2,4-dimethyl-1,3 dioxolane; and 4,4-dimethyl-1,3 dioxolane.

3. The cell of claim 2 wherein said anode is comprised of lithium.

4. The cell of claim 3 wherein said cathode is comprised of a member of the group consisting of $MnO_2$, $V_2O_5$, $CF_x$, $CrO_3$, and $Ag_2CrO_4$.

5. The cell of claim 3 wherein said cathode is comprised of $MnO_2$.

6. The cell of claim 5 wherein said solvent consists essentially of a mixture of said methyl substituted 1,3 dioxolane and a member of the group consisting of propylene carbonate, gamma butyrolactone, and sulfolane.

7. The cell of claim 5 wherein said solvent consists essentially of a mixture of said methyl substituted 1,3 dioxolane and propylene carbonate.

8. The cell of claim 7 wherein said electrolyte salt is selected from the group consisting of $LiClO_4$, $LiAsF_6$, and lithium trifluoromethane sulfonate.

9. The cell of claim 7 wherein said electrolyte salt is $LiClO_4$.

10. A non-aqueous electrochemical cell comprised of an anode comprised of lithium, a cathode comprised of $MnO_2$, and an electrolyte comprised of an electrolyte salt selected from the group consisting of $LiClO_4$, $LiAsF_6$, and lithium trifluoromethane sulfonate dissolved in an electrolyte solvent comprised of 4-methyl-1,3 dioxolane.

11. The cell of claim 10 wherein said solvent consists essentially of said 4-methyl-1,3 dioxolane admixed with propylene carbonate.

* * * * *